J. JESSEN.
BOX FLANGING MACHINE.
APPLICATION FILED FEB. 18, 1916.

1,206,441.

Patented Nov. 28, 1916.
9 SHEETS—SHEET 1.

Fig. 1.

WITNESSES

INVENTOR
JAMES JESSEN
BY Lathrop & Johnson
ATTORNEYS

Fig. 3

J. JESSEN.
BOX FLANGING MACHINE.
APPLICATION FILED FEB. 18, 1916.

1,206,441.

Patented Nov. 28, 1916.
9 SHEETS—SHEET 8.

WITNESSES

INVENTOR
JAMES JESSEN
BY Lothrop & Johnson
ATTORNEYS

UNITED STATES PATENT OFFICE.

JAMES JESSEN, OF MINNEAPOLIS, MINNESOTA, ASSIGNOR TO BROWN MACHINERY MANUFACTURING COMPANY, OF ST. PAUL, MINNESOTA, A CORPORATION OF MINNESOTA.

BOX-FLANGING MACHINE.

1,206,441.      Specification of Letters Patent.      Patented Nov. 28, 1916.

Application filed February 18, 1916. Serial No. 79,072.

*To all whom it may concern:*

Be it known that I, JAMES JESSEN, a citizen of the United States, residing at Minneapolis, in the county of Hennepin and State of Minnesota, have invented certain new and useful Improvements in Box-Flanging Machines, of which the following is a specification.

My invention relates to improvements in machines designed particularly for gluing flange tops upon boxes such as pasteboard candy boxes, and consists particularly in means for positioning and bringing together the box top and flange top and for gluing said parts together.

To this end the invention consists in the features of construction, combination, and arrangement of parts hereinafter described and claimed.

In the accompanying drawings forming part of this specification.

Figure 1:
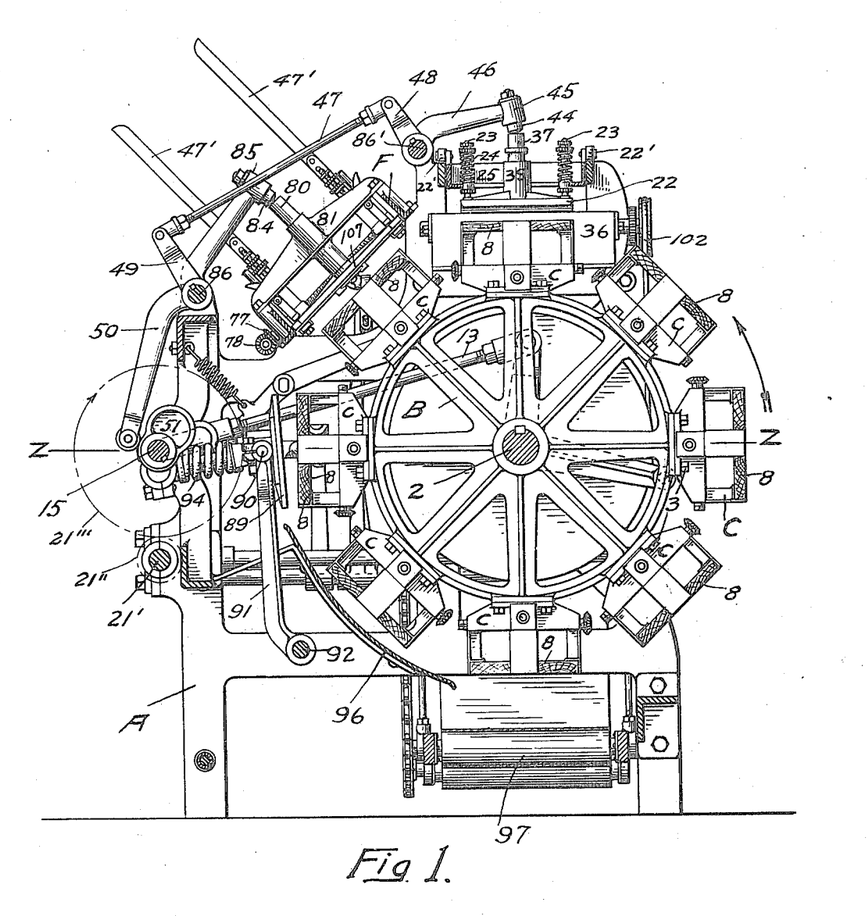
Figure 1 is a side elevation of my improved machine with a portion of the framework removed.
Figure 2:
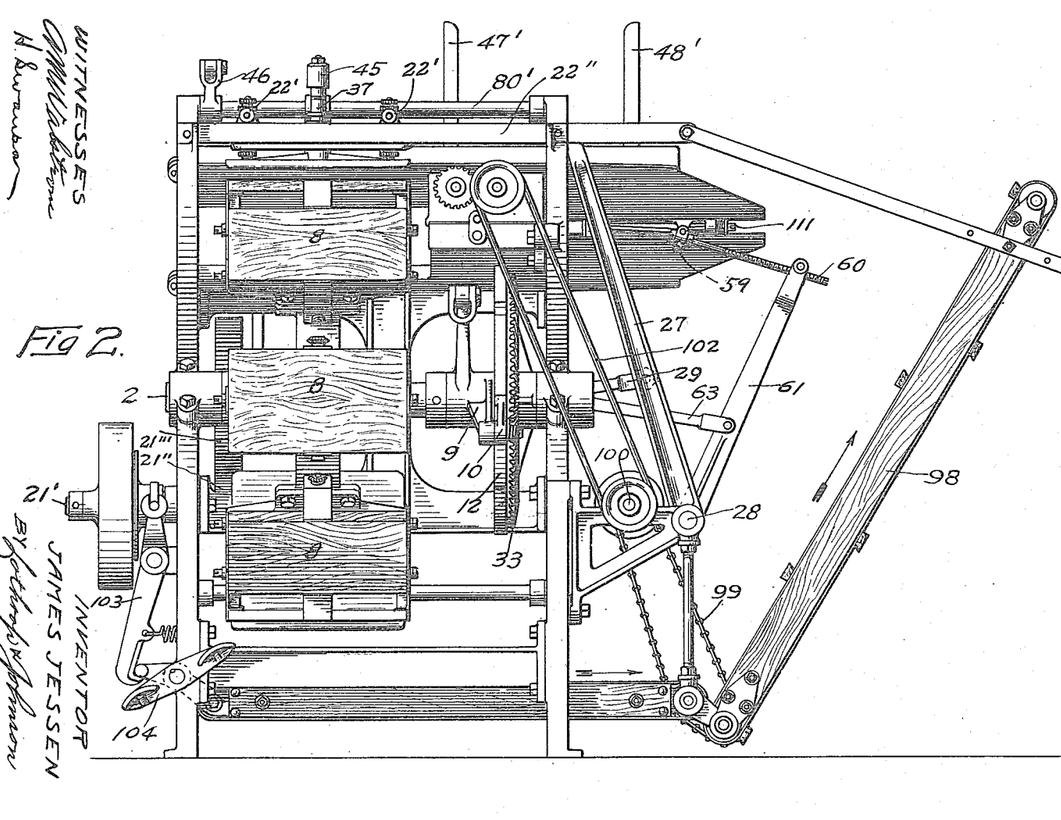
Fig. 2 is a front elevation of the same.
Figure 3:
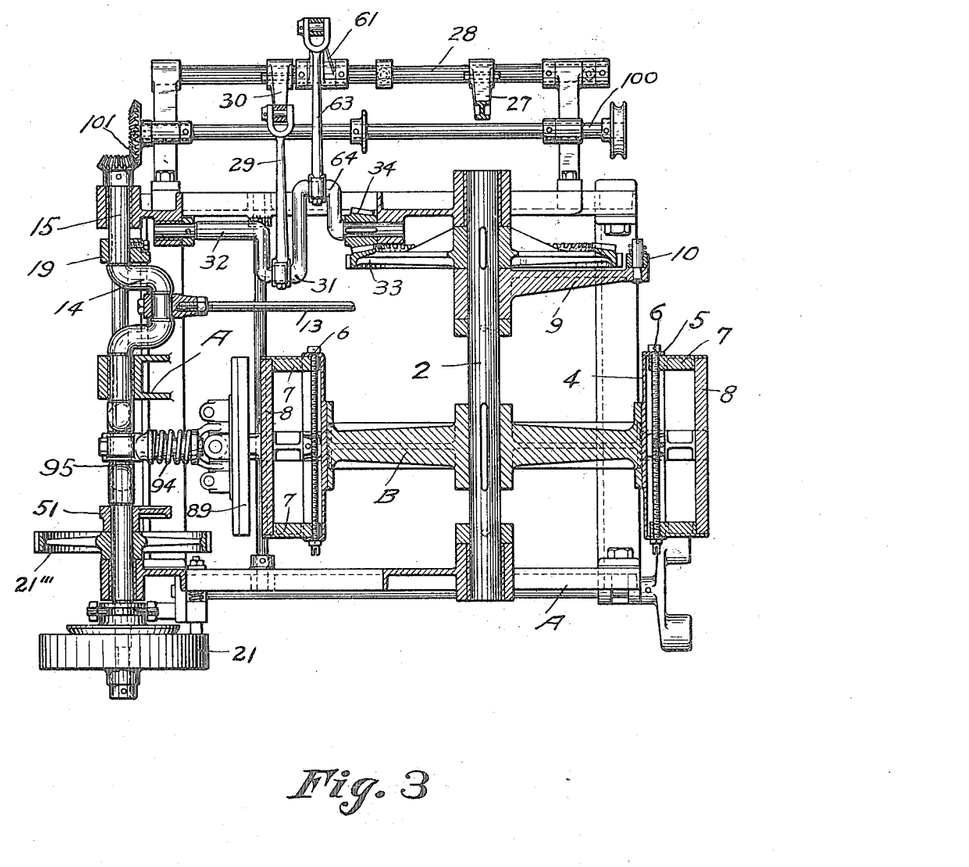
Fig. 3 is a section on line z—z of Fig. 1.
Figures 13, 14:
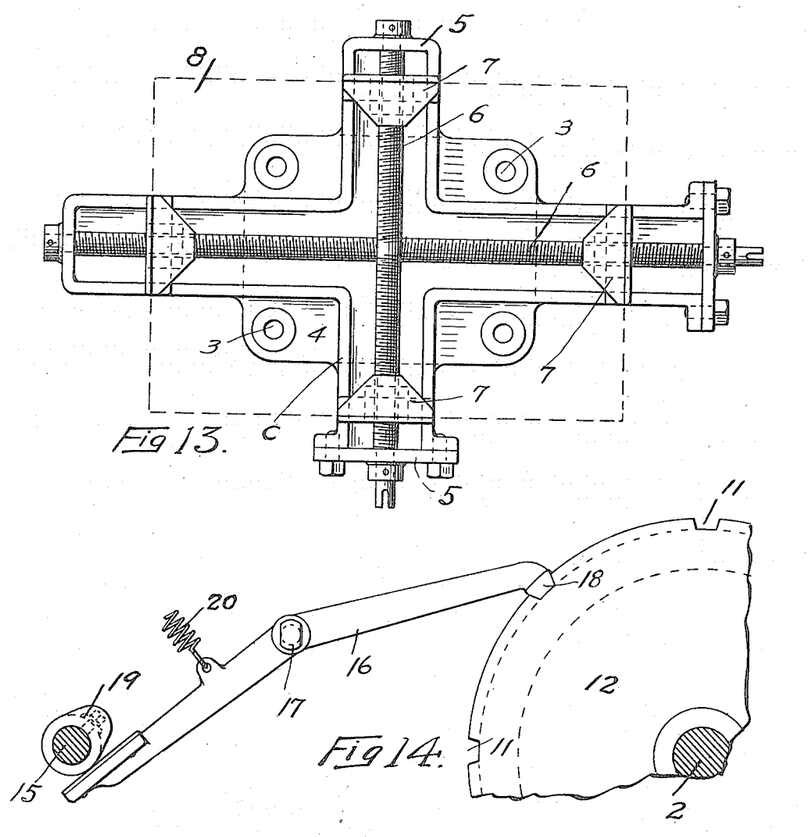
Fig. 13 is a plan view of one of the box top holders.
Fig. 14 is a detail of locking mechanism for the rotary carrier.

Referring to the drawings, A represents the supporting framework of the machine. Mounted upon a central shaft 2 journaled in the framework is a rotary carrier B supporting upon its periphery a plurality of box top holders C. The box top holders are secured as by bolts 3 around the periphery of the carrier in spaced relation. Each box top holder consists of a base plate 4 formed with outwardly bent side flanges 5 through which flanges extend screw threaded bolts 6. The sides 7 of the box top holder are threaded upon the shafts 6 inside the flanges 5 so as to be adjustable toward each other upon said shafts, said sides supporting the removable top 8 of the holder. Thus the box top holder may be adjusted to support different sizes of box tops H, tops 8 of proper size to conform to the adjustments of the holders being used.

The carrier B is given an intermittent step movement by means of a bell crank 9 journaled upon the carrier shaft and supporting a pawl 10 engaging with notches 11 in the periphery of the disk 12 mounted upon the carrier shaft. The crank lever is operatively connected by a rod 13 with a crank 14 of the main driving shaft 15. For the purpose of holding the carrier in adjusted positions I provide a lever arm 16 having fulcrum support 17 at one side of the disk 12, said lever arm being formed with a downturned end 18 fitted to the notches 11 and being adapted to be turned out of said notches as the carrier is rotated, by a cam 19 mounted upon the main driving shaft and turning said arm against the tension of the restraining spring 20 in the operation of the apparatus. The main driving shaft is suitably actuated from a source of power not shown, through a pulley 21 mounted upon the shaft 21' and transmitting the power to the main driving shaft 15 through a pinion 21" and gear 21'''.

In the operation of the apparatus the boxes are placed upon the holders C and the box top flanges E are glued upon the box tops by the following described parts. Supported by the framework of the machine above the carrier to carry out the first step of the operation is the mechanism for applying glue to the box top supported upon the holder. This consists of a glue depositing plate 22 having vertically slidable spring pressed support, through the medium of the posts 23 and springs 24, in the horizontally slidable plate supporting carrier 25. The carrier 25 supports rollers 22' which travel upon the rails 22".

The plate supporting carrier 25 is reciprocated by the rod 26 connecting the carrier with the upper end of a lever 27 secured upon a shaft 28, which shaft is given a rocking motion through the medium of a rod 29 having crank connection 30 at one end with the shaft 28 and at the opposite end being connected with the crank 31 of the crank shaft 32 which crank shaft is driven from the gear wheel 33, formed integral with the disk 12 mounted upon the carrier supporting shaft, through the medium of the pinion 34 carried by the crank shaft and intermeshing with said gear wheel. The glue delivery plate 22 in the reciprocation of the rod 26 is carried over the glue delivery rollers 35 journaled in the glue pot 36 whereby the rollers 35 deposit glue upon the face of the plate 22. The continued movement of the rod 26 carries the glue depositing plate 22 over the box top as shown in dotted lines in Fig. 9. When in the dotted line position the glue depositing plate is forced down against the box top as shown in Fig. 10 by the following described mechanism.

Figure 15:
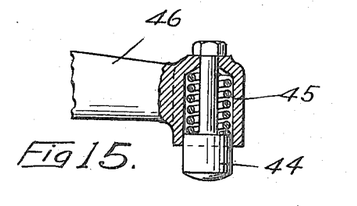
Fig. 15 is a sectional view of an actuating head forming part of the invention.
Figure 16:
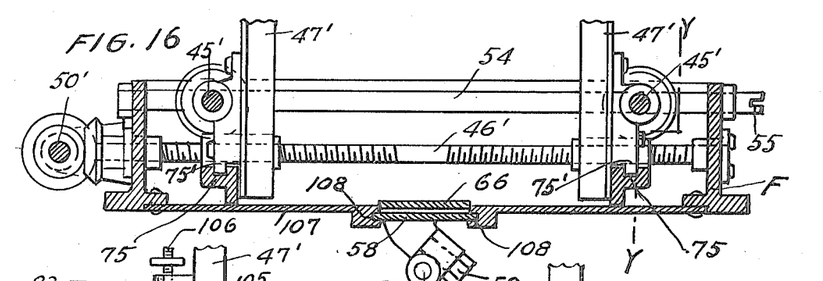
Fig. 16 is a section on line v—v of Fig. 5.
Figure 17:
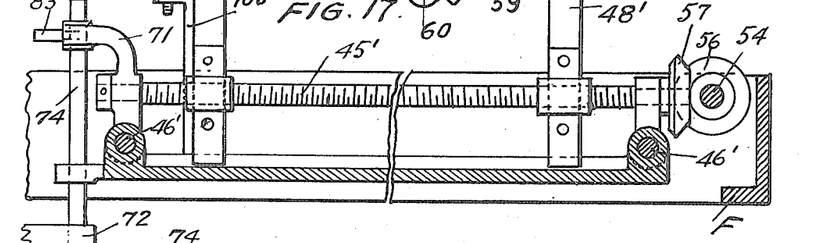
Fig. 17 is a section on line y—y of Fig. 16.
Figure 18:
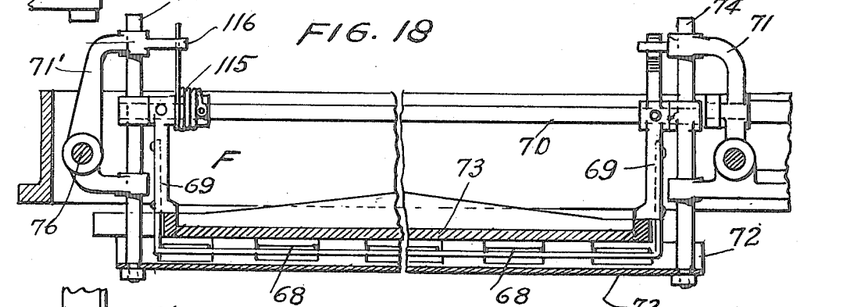
Fig. 18 is a similar section to Fig. 17 of the adjoining part of the mechanism.

Having central slidable support upon the plate 22 is a plunger 37 normally held in raised position by a coil spring 38 surrounding the plunger inside the supporting housing 39 carried by the plate 22. An inner plunger 40 is slidably supported within the plunger 37 by means of a cross pin 41 carried by the inner plunger and extending through vertical slots 42 in the outer plunger. The inner plunger 40 is normally held pressed down with the pin 41 in the lower ends of the slots 42 by means of the coil spring 43 positioned above the inner plunger. When the glue depositing mechanism is in the dotted line position shown in Fig. 9, a cam 44, having spring support 45 in the end of an arm 46, stands directly above the plunger 37. The arm 46 is actuated by means of a rod 47 connecting the end of a crank 48, projecting upwardly from the fulcrumed end of the lever arm 46, with the crank arm 49 projecting upwardly from the fulcrumed end of the downwardly extending lever arm 50. The lower free end of the lever arm 50 is actuated from a cam 51 carried by the main driving shaft.

Figures 9, 10, 11, 12:
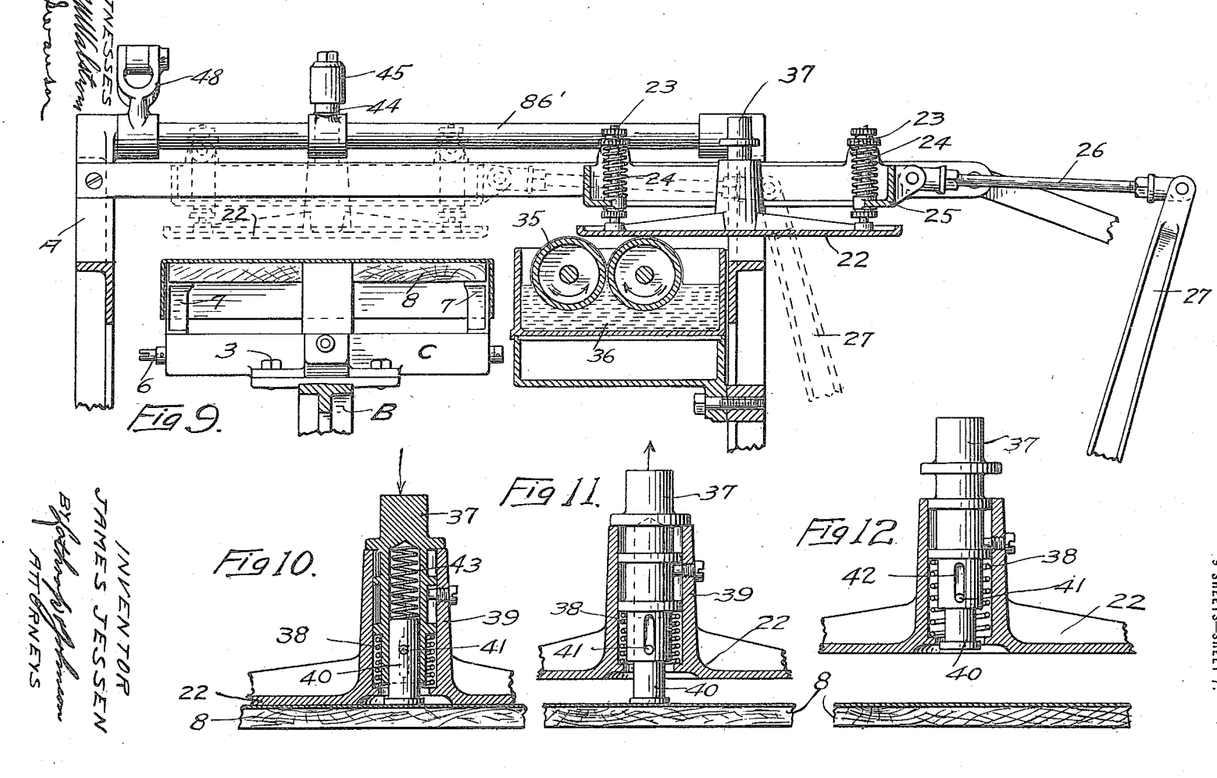
Fig. 9 is a sectional view of the gluing apparatus and box top support taken on the line A—A of Fig. 4.
Fig. 10 is a section of a pressing and releasing member of the gluing press.
Figs. 11 and 12 are sections corresponding with the section shown in Fig. 10, shown partly in elevation, and illustrating successive steps of the parts.

Figs. 10, 11, and 12 show three successive steps of the plungers 37 and 40. Fig. 10 shows the parts with the glue depositing plate pressed against the box top to deposit glue thereon. Fig. 11 shows the next step in which the cam 44 has been lifted high enough to allow the raising of the plate from the box top, with the inner plunger 40, which will hereinafter be referred to as a stripping plunger, held in contact with the box top by the spring 43. Fig. 12 illustrates the next step in which the continued lifting of the plunger 44 has allowed the further raising of the outer plunger carrying with it the stripping plunger out of contact with the box top. The stripping plunger 40 acts to strip or release the box top from the plate 22, to prevent it being pulled therewith out of its position upon the box top holder.

From the gluing mechanism the rotating carrier carries a box cover which has received its supply of glue to the flange depositing mechanism. This mechanism is shown specifically in Figs. 5, 6, 7 and 8 and Figs. 16 to 19. It consists essentially of a flange holder supporting framework F within which is journaled parallel side screw shafts 45', and end screw shafts 46', the ends of said shaft being oppositely threaded. Corner guides 47' and 48' for the box top flanges E are provided having threaded support upon the opposite ends of the shafts 45'. Journal bearings 49' for the shafts 45' have threaded support on the cross shafts 46' whereby the turning of the shafts 46' will move the shafts 45' inwardly toward each other. The shafts 46' are rotated in their bearings by means of an actuating shaft 50' formed with a key end 51, and carrying beveled pinions 52 intermeshing with pinions 53 mounted upon the adjacent ends of the shafts 46'. To provide for the different lengths of flanges I provide the actuating shaft 54, formed with a key end 55 and carrying pinions 56 intermeshing with pinions 57 upon the adjacent ends of the shafts 45'. Thus by turning the actuating rod 50' the shafts 45' are drawn toward each other to adjust the corner guides to different widths of box cover flange and by rotating the shafts 54 the guides 48' and 47' are moved toward each other, to provide for different lengths of box cover flange. The brackets 47' and 48' constitute a receiver for a superimposed plurality of flange tops as shown in Fig. 6.

Figure 6:
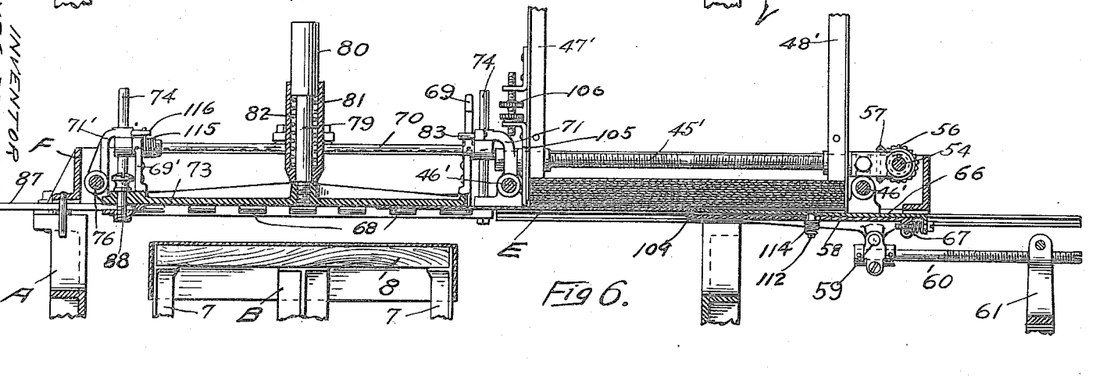
Fig. 6 is a section on line x—x of Fig. 5 showing a section of a box top support.
Figure 19:
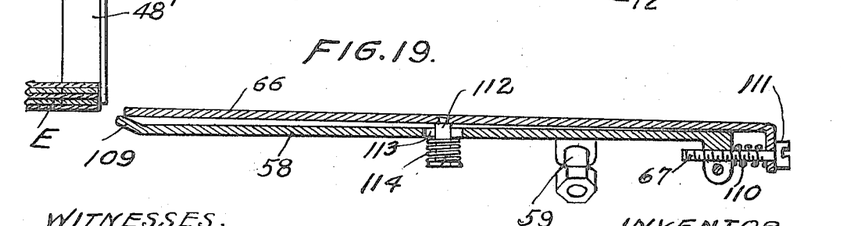
Fig. 19 is a longitudinal section of a feeding slide shown in connection with the adjacent portion of the flange top holder.

The brackets 47' support slidable extensions 105 having adjustable connection 106 with the brackets, whereby said extension plates may be set as shown in Fig. 6 at the desired distance from the plate 107 constituting the bottom of the flange receptacle, leaving a passageway between the bracket extensions 105 and the receptacle bottom 107 for the lowermost flange. Slidable in grooves 108 is a plate 58, said plate having fulcrum support 59 for one end of a rod 60, the other end of the rod having screw threaded support in the end of the lever 61, the lever 61 being loosely supported at its lower end on the shaft 28. The lever 61 is connected by a link 63 with the crank 64 of the crank shaft 32. The forward end 109 of the plate 58 is upturned as shown in Fig. 19. Slidably supported upon the plate 58 is a plate 66, the plate 66 being slidably connected with the plate 58 by means of a screw 67 supported by the downwardly projecting end of the plate 66 and threaded through the adjacent downwardly projecting flange of the plate 58. A spring 110 is interposed between the connected ends of the plates 66 and 58, and the screw is formed with a suitable key end 111 to allow the plate 66 being forwardly adjusted upon the plate 58. As shown in Fig. 19 as the plate 66 is moved forwardly upon the plate 58 its front end will travel upwardly upon the upturned end 109 of the plate 58 to adjust it to different thicknesses of flanges and to strike against the adjacent end of the lowermost flange E in position between the brackets 47' and 48'. A stud 112 projects downwardly from the plate 66 through a slotted opening 113 in the plate 58, a coil spring 114 being interposed between the lower end of the stud and plate 58 whereby to exert a downward spring pull upon the plate 66. Thus as the plate 58 is shoved forwardly by the lever 61 the upturned end 109 of the plate 58 will pass under the lowermost flange E and the front end of the plate 66 will make contact with said flange to force the same forwardly onto the fingers 68 which extend downwardly and inwardly from the levers 69. The levers 69 have fulcrum support on the parallel shafts 70, which parallel shafts 70 have journal support on upright rods 74 slidable in the yokes 71 and 71', said yokes having threaded support on the oppositely threaded ends of the cross shaft 76 and the opposed shaft 46'. A coil spring 115 is supported by the shaft 70 with its projecting end adapted to be engaged by a finger 116 carried by the adjacent yoke 71' to normally hold the levers 69 in the position shown in Fig. 7. The cross shaft 76 has pinion connection 77 and 78 with the shaft 50'.

Figure 4:
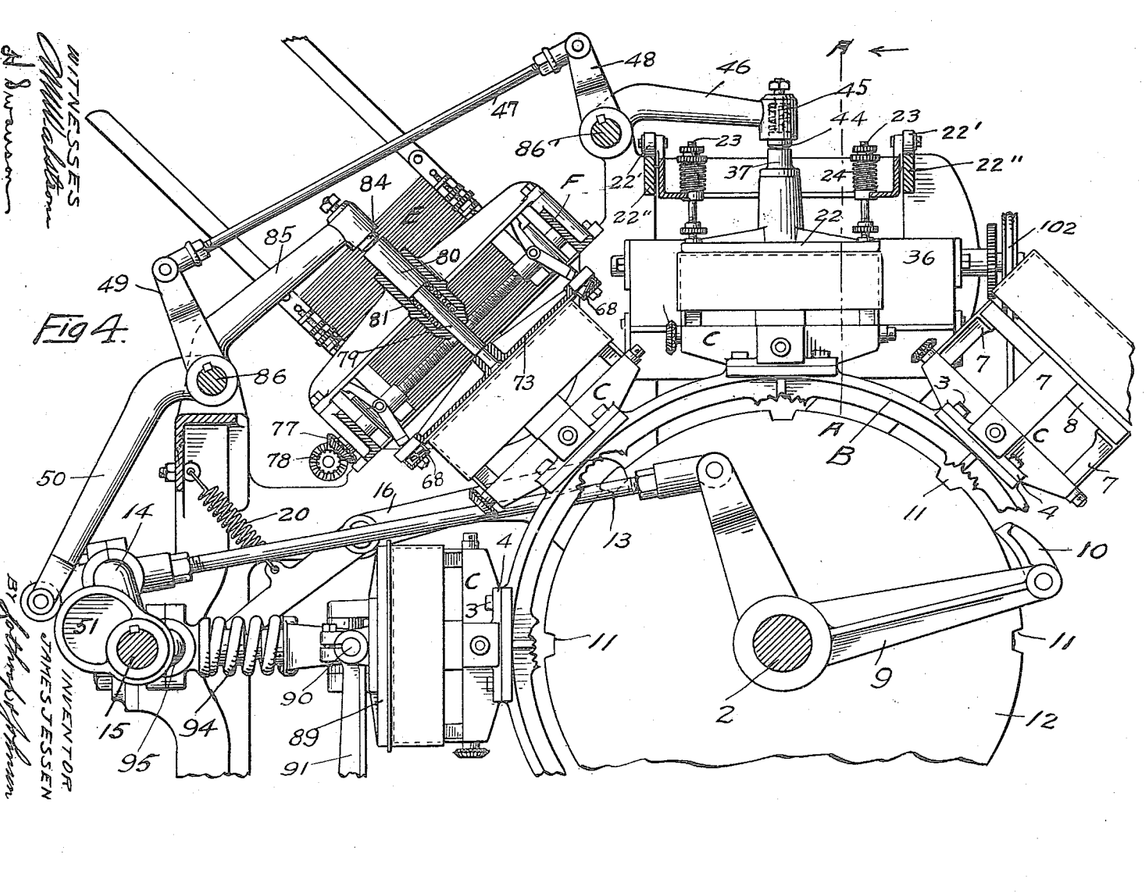
Fig. 4 is a similar view to Fig. 1, showing a further step in the position of the parts and showing a portion of the parts in Fig. 1 removed and a portion in section.
Figure 5:
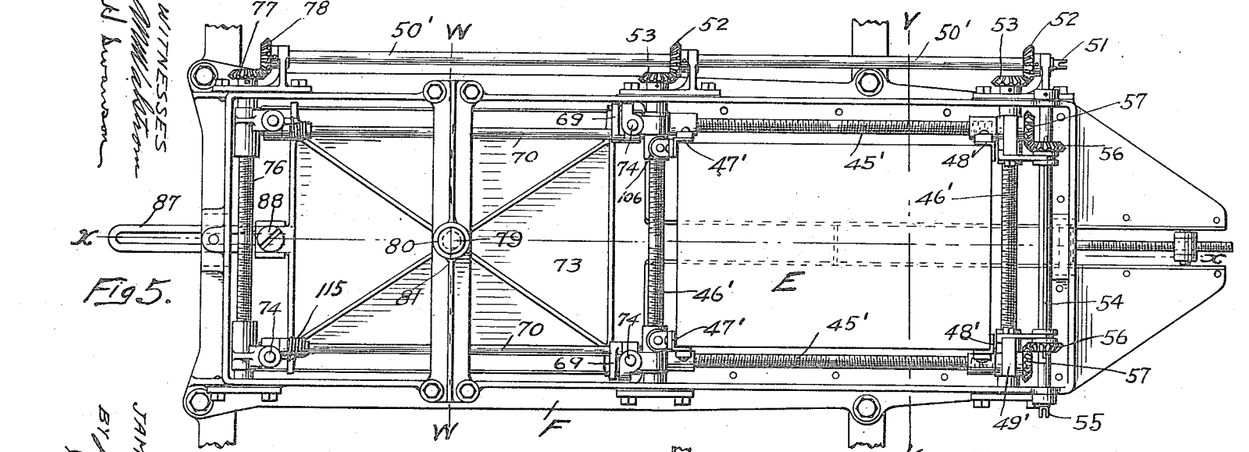
Fig. 5 is a plan view of the flange top holder and feeding mechanism.
Figure 7:
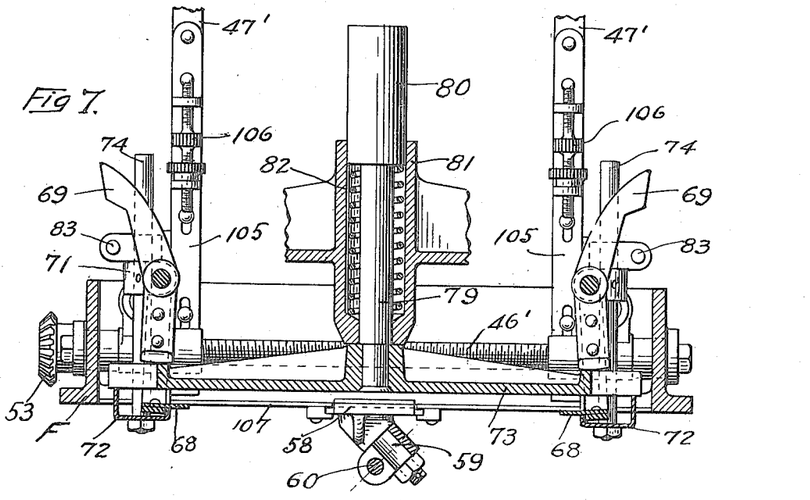
Figs. 7 and 8 are sections on line w—w of Fig. 5 shown partly in elevation, Fig. 8 showing the parts in a different step of the operation than Fig. 7.
Figure 8:
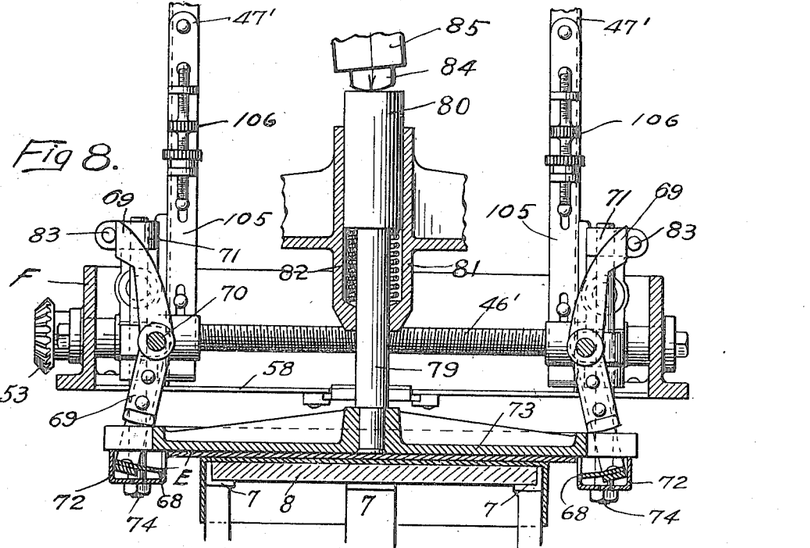

The rods 74 project upwardly from the housings 72 within which housings the fingers 68 stand as shown in Figs. 7 and 8. The housings 72 stand underneath the opposite sides of the plate 73, which plate is formed with a central upwardly extending plunger 79, the upper end of the plunger being formed with a head 80 seated within a housing 81 forming part of the framework of the machine. Between the bottom of the housing 81 and the head 80 is interposed a coil spring 82 to normally hold the plate 73 raised. In the raised position of the plate the fingers 68 will stand in the horizontal position shown in Fig. 7 projecting some distance beyond the housing 72 to form supports for the top flange E. As the plate 73 is lowered in the operation of the machine, the upper ends of the lever arms 69 will be engaged by the pins 83, supported adjacent the outside thereof, to turn said lever arms 69 upon their fulcrums as illustrated in Fig. 8 to carry the fingers into the housing 72 and into the inclined position shown, to release and allow the supported top flange to be shoved down upon the box top supported below the same upon the carrier. As the plate is lowered the sides of the housing 72 form guides for the top flange to position it upon the box top as shown in Fig. 4. The lowering of the housing 72 and plate 73 is brought about by a cam 84 corresponding in construction to the cam 44 bearing against the top of the plunger. The cam 84 is supported in the end of the lever arm 85, which lever arm at its outer end is supported upon the shaft 86 journaled above the frame, said shaft 86 being turned by the arm 50 which extends downwardly and is actuated by the cam 51. The turning of the rod 50' to adjust the shafts 46' inwardly to accommodate different widths of top flanges as hereinbefore pointed out, likewise through the turning of the shaft 76 draws the supporting parts of said fingers inwardly to likewise conform to the width of the box top flange. To form a stop for the flange and prevent overthrow I provide the slide 87 having slidable support in the end of the frame F and held in adjusted positions by a screw 88. By unloosening the screw the slide may be shoved inwardly to conform to different lengths of box top flange.

From the box top flange depositing mechanism heretofore described, the rotation of the machine brings the box top holder, supported box top, and superimposed top flange underneath the final pressing plate 89. The plate 89 has pivotal support 90 upon the upper end of a lever 91, which lever 91 has pivotal support 92 on the framework A. The plate 89 has yielding coil spring connection 94 with a crank 95 of the main shaft 15. The operation of the parts are so arranged that as the box top holder with its supported box top reaches a position in front of the plate 89 the plate will be forced inward by the crank 95 to press the box flange firmly against the box top. The spring connection between the plate 89 and crank 95 of the main shaft allows the proper yielding pressure of the plate against the top flange.

The continued operation of the machine successively brings the box top holders with their supported tops into position downwardly facing the chute 96, onto which chute each box top drops from its supporting holder. From the chute 96 the released box top drops to the horizontal carrier 97 passing from the horizontal carrier to the delivery conveyer 98. The conveyer has suitable driving connection 99 with an auxiliary driving shaft 100 which driving shaft has gear connection 101 with the main shaft 15. The gluing rollers heretofore described likewise have driving connection 102 with said auxiliary driving shaft. In Fig. 2 I show a clutch releasing mechanism 103—104 which, forming no part of the novelty of my invention is not specifically described.

As has already been pointed out in the detailed description of the operating parts, the carrier is given a step by step rotation. The operation of the machine successively brings each box top holder underneath the gluing mechanism which deposits glue upon the top surface of the box top, the next step carrying the box top underneath the top flange depositing mechanism, which deposits the lower flange on the glued box top and presses it thereon, next carrying the box top with the superimposed top flange underneath the pressing plate 89, which is actuated to more firmly press the top flange against the box after the glue has been partially set, the continued operation of the machine allowing the box top to drop from its supporting block and be carried away.

I claim:

1. A machine of the class described comprising a rotary carrier, a plurality of box top holders peripherally supported by said carrier, glue depositing mechanism supported adjacent to said carrier, means arranged adjacent to said carrier for supporting a plurality of superimposed box top flanges, means for imparting a step by step rotary movement to said carrier to successively carry the box top holders past said glue depositing means and flange receptacle, and means for actuating said glue depositing mechanism and depositing the lowermost flange in said receptacle upon an adjacent holder supported box top for the purpose set forth.

2. A machine of the class described comprising a rotary carrier, a box top holder supported by said carrier, means arranged adjacent to said carrier for applying glue to a box supported upon said holder, means arranged adjacent said carrier for supporting a superimposed plurality of box top flanges, means for engaging with and shoving the lowermost flange outwardly from the remainder of the flanges, and depositing the same upon an adjacent holder-supported box top, and means for rotating said carrier.

3. A machine of the class described comprising a rotary carrier, actuating means therefor, means for supporting a plurality of boxes or box covers upon the periphery of said carrier, glue depositing means arranged in position to apply glue to the carrier supported boxes or covers in the rotation of the carrier, flange holding means arranged adjacent to said carrier, adjacent flange depositing means, means for shoving the lowermost flange in said holding means into said depositing means, and means for actuating said depositing means to carry the supported flange against an adjacent carrier supported box top or cover.

4. A machine of the class described comprising a rotary carrier, actuating means therefor, means for supporting a plurality of boxes or box covers upon the periphery of said carrier, glue depositing means arranged in position to apply glue to carrier supported boxes or covers in the rotation of the carrier, flange holding means arranged adjacent to the periphery of said carrier, adjacent flange depositing means, an adjustable slide arranged at the bottom of said flange holding means, means for actuating said slide to shove the lowermost flange into said depositing means, and means for actuating said depositing means to carry the supporting flange against an adjacent carrier supported box top or cover.

5. A machine of the class described comprising a rotary carrier, actuating means therefor, means for supporting a plurality of boxes or box covers upon the periphery of said carrier, glue depositing means arranged in position to apply glue to carrier supported boxes or covers in the rotation of the carrier, flange holding means arranged adjacent to the periphery of said carrier, said holding means being adjustable to conform to different sizes of flanges, an adjustable slide for shoving the lowermost flange in said holding means outwardly therefrom, and means for depositing such flange upon an adjacent carrier supported box cover or box.

6. A machine of the class described comprising a rotary carrier, actuating means therefor, means for supporting a plurality of boxes or box covers upon the periphery of said carrier, glue depositing means arranged in position to apply glue to carrier supported boxes or covers in the rotation of the carrier, flange holding means arranged adjacent the periphery of said carrier, said means being adjustable to conform to different sizes of flanges, depositing means arranged adjacent to said flange holding means, means for sliding the lowermost flange from said holding means into relation with said flange depositing means, and means for actuating said depositing means to place a supported flange upon an adjacent carrier supported box or cover and release the flange when so placed.

7. A machine of the class described comprising a rotary carrier, actuating means therefor, means for supporting a plurality of boxes or box covers upon the periphery of said carrier, glue depositing means arranged in position to apply glue to carrier supported boxes or covers in the rotation of the carrier, flange holding means arranged adjacent to the periphery of said carrier, said supporting means comprising a bottom plate and adjustable corner brackets, adjacent flange depositing means, means for shoving a flange resting upon said plate into relation with said flange depositing means, and means for actuating said depositing means to deposit a supported flange onto an adjacent carrier supported box cover or box.

8. A machine of the class described comprising a rotary carrier, actuating means therefor, means for supporting a plurality of boxes or box covers upon the periphery of said carrier, glue depositing means arranged in position to apply glue to carrier supported boxes or covers in the rotation of the carrier, flange holding means arranged adjacent to the periphery of said carrier and a plurality of adjustably positioned flange holding brackets, adjacent flange depositing means, a slide positioned below said brackets, means for actuating said slide to carry the lowermost flange into relation with said depositing means, means for adjusting said slide, and means for actuating said depositing means to place a supported flange upon an adjacent carrier supported box cover or box.

9. A machine of the class described comprising a rotary carrier, actuating means therefor, means for supporting a plurality of boxes or box covers upon the periphery of said carrier, glue depositing means arranged in position to apply glue to carrier supported boxes or covers in the rotation of the carrier, flange holding means arranged adjacent to the periphery of said carrier, means for sliding the lowermost flange of said holding means into relation with an adjacent flange depositing mechanism, said flange depositing mechanism comprising fulcrumed flange supporting fingers, and means for carrying said fingers into position placing a supported flange upon a carrier supported box top cover and for turning said fingers into releasing position when said flange is so placed.

10. A machine of the class described comprising a rotary carrier, actuating means therefor, means for supporting a plurality of boxes or box covers upon the periphery of said carrier, glue depositing means arranged in position to apply glue to carrier supported boxes or covers in the rotation of the carrier, flange holding means arranged adjacent to the periphery of said carrier, means for sliding the lowermost flange of said holding means onto adjacent flange depositing mechanism, said flange depositing mechanism comprising fulcrumed flange supporting fingers, means for carrying said fingers into position for placing a supported flange upon a carrier supported box top cover and for turning said fingers into releasing position when said flange is so placed, and spring means normally holding said fingers in flange supporting position.

11. A machine of the class described comprising a rotary carrier, actuating means therefor, means for supporting a plurality of boxes or box covers upon the periphery of said carrier, glue depositing means arranged in position to apply glue to carrier supported boxes or covers in the rotation of the carrier, flange holding means arranged adjacent the periphery of said carrier, means for shoving the lowermost flange of said holding means onto adjacent flange depositing means, said flange depositing means comprising parallel flange supporting members, means adjustably positioning said members to accommodate different sizes of flanges, and means for actuating said members to place a supported flange upon an adjacent carrier supported box or cover and release said flange when so placed.

12. A machine of the class described comprising a rotary carrier, actuating means therefor, means for supporting a plurality of boxes or box covers upon the periphery of said carrier, glue depositing means arranged in position to apply glue to carrier supported boxes or covers in the rotation of the carrier, flange holding means arranged adjacent to the periphery of said carrier, means for shoving the lowermost flange from said holding mechanism onto adjacent flange depositing means, said flange depositing means comprising parallel flange supporting members, means adjustably positioning said members to accommodate different sizes of flanges, means for actuating said members to place a supported flange upon an adjacent carrier supported box or cover and release said flange when so placed, and spring means normally holding said flange depositing means in raised position.

13. A machine of the class described comprising a rotary carrier, actuating means therefor, means for supporting a plurality of boxes or box covers upon the periphery of said carrier, glue depositing means arranged in position to apply glue to carrier supported boxes or covers in the rotation of the carrier, flange holding means arranged adjacent to the periphery of said carrier, adjacent flange depositing means comprising pivotally mounted parallel flange supporting members, means for shoving the lowermost flange from said holding mechanism onto said members, means for carrying said members toward an adjacent carrier supported box or cover to place a supported flange thereon, means for swinging said members into released position as said flange is placed, and spring means for returning said flange depositing mechanism to normal position.

14. A machine of the class described comprising a rotary carrier, a plurality of box top supports peripherally supported on said carrier, each of said box top supports comprising cross shafts having oppositely threaded ends, top board supporting brackets threaded upon the ends of said shafts, glue depositing mechanism supported adjacent said carrier, means adjacent to said carrier for supporting a plurality of superimposed box top flanges, means for rotating said carrier, means for successively actuating said glue depositing mechanism to deposit glue upon a box top supported upon one of said supports, and means for thereafter depositing a supported flange upon said box top or cover.

15. A machine of the class described comprising a rotary carrier, a plurality of box top or cover supports peripherally supported by said carrier, glue depositing mechanism supported adjacent to said carrier, comprising a glue receptacle and glue depositing plate slidably supported in connection with said receptacle, means for carrying said plate against an adjacent carrier supporting box or cover, means for holding a plurality of box top flanges adjacent to the periphery of said carrier, and means for carrying a flange from said holding means against an adjacent carrier supported box top or cover.

16. A machine of the class described comprising a rotary carrier constructed to support on its periphery box tops or covers, means for imparting a rotary motion to said carrier, gluing mechanism arranged adjacent to the periphery of the carrier comprising a glue receptacle, a depositing plate slidably arranged in connection with said receptacle, means for carrying said plate over and past said receptacle, means for carrying said plate against an adjacent carrier supported box or cover, a spring restrained stripping plunger supported by said plate, flange top holding means, and means for depositing a flange top from said holding means upon an adjacent carrier supported box or cover.

17. A machine of the class described comprising a carrier constructed to support a plurality of box tops or covers, means for imparting step by step travel to said carrier, glue depositing mechanism arranged adjacent to said carrier comprising a glue receptacle, delivery rollers supported therein, a depositing plate slidably supported over said rollers, means for sliding said plate over said rollers and carrying the same against an adjacent carrier supported box or cover, a spring restrained stripping plunger supported by said plate, a flange top holder, and means for carrying a flange top from said holder against an adjacent carrier suppported box or cover.

18. A machine of the class described comprising a carrier constructed to support a plurality of boxes or covers, means for imparting travel to said carrier, glue depositing mechanism arranged adjacent to said carrier comprising a glue receptacle, a slidable plate, means for actuating said plate to receive glue from said receptacle, means for thereafter carrying said plate against an adjacent carrier supported box or cover, a slidable spring restrained stripping plunger carried by said plate, and means allowing said stripping plunger to remain for a predetermined length of time in contact with a deposited flange while the plate is being carried away therefrom, a flange top holder, and means for depositing a flange top from said holder onto an adjacent carrier supported box or cover.

19. A machine of the class described comprising a rotary carrier, a plurality of box top supports carried thereby, glue depositing mechanism supported adjacent to the periphery of said carrier comprising a glue delivery receptacle, delivery rollers mounted therein, a plate slidably supported above said rollers, means for sliding said plate over said rollers and beyond the receptacle, means for carrying said plate against an adjacent carrier supported box or cover, a spring pressed plunger supported by said plate in position to be engaged by the means carrying said plate against the cover, a stripping plunger having spring pressed slidable support within said first mentioned plunger, spring means holding said stripping plunger in contact with the flange top while said plate is being withdrawn, a flange top holder, and means for depositing a flange top from said holder upon an adjacent supported box top or cover.

20. A machine of the class described comprising a rotary carrier, a plurality of box top supports carried thereby, glue depositing mechanism supported adjacent to the periphery of said carrier comprising a glue delivery receptacle, delivery rollers mounted therein, a plate slidably supported above said rollers, means for sliding said plate over said rollers and beyond the receptacle, means for carrying said plate against an adjacent carrier supported box or cover, a spring pressed plunger supported by said plate in position to be engaged by the means carrying said plate against the cover, a stripping plunger having spring pressed slidable support within said first mentioned plunger, spring means holding said stripping plunger in contact with the flange top while said plate is being withdrawn, a flange top holder, and spring restrained means for thereafter pressing said flange top against the box cover.

21. A machine of the class described comprising a rotary carrier, a plurality of box top supports peripherally supported by said carrier, glue depositing mechanism supported adjacent to said carrier, means arranged adjacent to said carrier for holding a plurality of superimposed box top flanges, means for imparting a step by step rotary movement to said carrier to successively carry the box top supports past said glue depositing means and flange top holder, means for actuating said glue depositing mechanism and depositing the lowermost flange in said holder upon an adjacent box top supported box or cover for the purpose set forth, a spring controlled locking lever for said carrier, and means for turning said locking lever out of locking engagement in the rotation of said carrier.

In testimony whereof I affix my signature in presence of two witnesses.

JAMES JESSEN.

Witnesses:
H. SWANSON,
H. S. JOHNSON.

Copies of this patent may be obtained for five cents each, by addressing the "Commissioner of Patents, Washington, D. C."